Jan. 31, 1933.   S. M. HEPBURN   1,895,992
TRAILER HITCH
Filed June 4, 1931
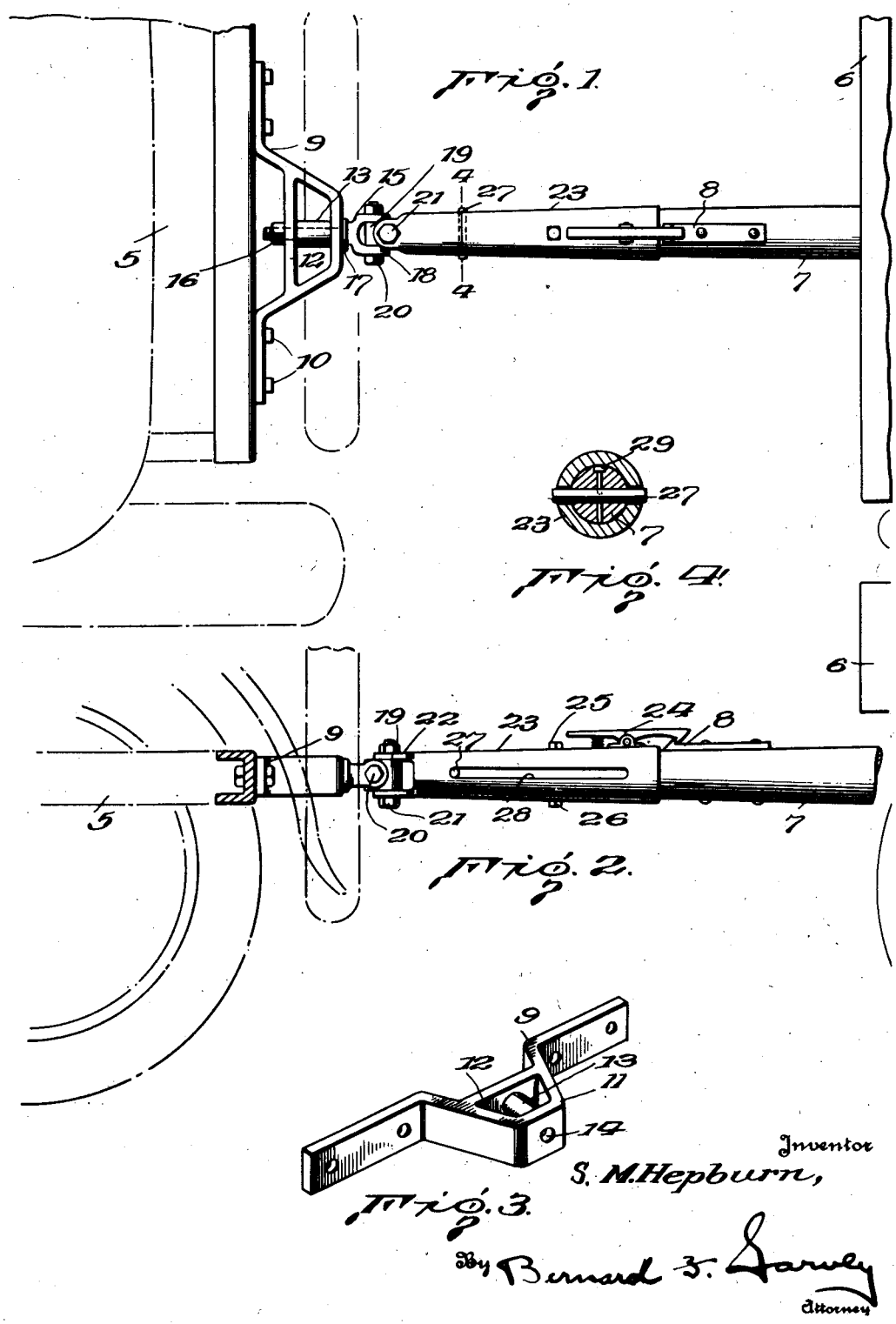
Inventor
S. M. Hepburn,
By Bernard F. Garvey
Attorney Patented Jan. 31, 1933

1,895,992

UNITED STATES PATENT OFFICE

STUART M. HEPBURN, OF PAMPA, TEXAS

TRAILER HITCH

Application filed June 4, 1931. Serial No. 542,133.

In the present invention I provide a trailer hitch or coupling which is especially adapted for use in engaging a trailer with a motor vehicle, regardless of the type of body employed in the latter, yet the invention will be found adaptable in coupling other vehicles or in towing incapacitated vehicles.

While I am aware that many inventions have been patented on trailer couplings, it is nevertheless an object of this invention to provide a hitch or coupling designed as an improvement over the prior art in simplicity and durability, together with effectiveness in operation without undue strain or damage on the motor vehicle or trailer.

The following additional objects of the invention are of coordinate importance:—to provide a hitch composed of relatively few parts, requiring no adjustment or attention after having been installed, the motor vehicle engaging part of which may be permanently attached to the latter and retained in an inconspicuous place thereon, without interference with any of the car accessories, yet readily accessible for quick engagement with the trailer; to provide a hitch which connects the motor vehicle to the trailer in a semi-automatic manner in that the urging of the trailer tongue into one of the motor vehicle coupling parts primarily connects the motor vehicle and trailer; and to provide a coupler which is positive in its operation, yet affords ample flexibility between the motor vehicle and trailer to prevent undue stress and strain thereon when travelling over inequalities in the road of travel.

Other objects of the invention will be apparent from the following description of the present preferred form of the invention, taken in connection with the accompanying drawing, wherein Fig. 1 is a top plan view of a trailer hitch, constructed in accordance with the present invention, illustrating the application thereof;

Fig. 2 is a side elevational view thereof;

Fig. 3 is a perspective view of the frame of the coupler which is secured to the motor vehicle; and Fig. 4 is a sectional view taken on the line 4—4 of Fig. 1.

In the drawing, in order to illustrate the application of this invention, I have shown a portion of a motor vehicle 5, and a portion of a trailer vehicle 6, the latter having a tongue 7 extended therefrom, the upper face of which has a latch member 8 fixedly secured thereto.

The coupler includes a frame 9, which may be made from a metal strap, the ends of which are detachably or otherwise secured to the frame or other permanent part of the motor vehicle, by bolts or like securing means 10. The intermediate part of the strap is arched or bowed outwardly to provide a truncated, cone-shaped housing 11. The sides of the housing 11 are braced by a cross-bar or strut 12, the ends of which latter are formed integral with the housing, approximately midway the ends of the housing. A bushing 13 is interposed between the apex of the housing and the brace or strut 12 and is provided with a bore, one end of which communicates with an opening 14, formed in the apex of the housing, the opposite end communicating with an opening formed in the brace 12.

The coupler also includes a clevis bolt 15, the shank of which extends through the opening 14 in the apex of the housing 11, through the bore of the bushing 13, and through the opening in the brace 12. The inner or free end of the shank is screw-threaded, adapted for the reception of a nut 16, which is adapted to impinge against the brace 12. The outer end of the bolt shank is enlarged to provide an annulus 17, bearing against the outer terminal of the housing 11, as shown to advantage in Fig. 1. The annulus 17 issues into the clevis head 18, which is of the usual U-shape conformation. Between the furcations of the clevis head I prefer to mount a swivel block 19, which has a pair of openings therethrough, running at right angles. One of the openings of the swivel block is adapted for the reception of a bolt 20, which latter also extends through the clevis head. The other opening of the swivel block is adapted for the reception of a bolt 21, the latter being also engaged through the terminal sides 22 of a tongue socket or thimble 23. It is to be understood that although the nut 16 of the swivel bolt engages the brace 12, nevertheless sufficient play is permitted to allow for a slight rotary movement of the clevis bolt in the housing 11. Additionally, it is of course, understood that the use of the swivel block 19 and the manner of connecting the same with the clevis bolt and tongue socket permits both vertical and horizontal movement of the latter. Consequently, ample flexibility is afforded between the frame 9 carried by the motor vehicle and the tongue socket 23, for a purpose more fully hereinafter described.

The tongue socket or thimble 23 is sleeved on the free end of the trailer tongue 7 and carries a yieldable pawl 24 which complements and is adapted to co-act with the latch element 8 of the tongue 7. Consequently, when the tongue 7 is urged into the socket 23, a sufficient distance, one end of the pawl 24 will wipe over one end of the latch element 8 and automatically engage, so as to connect the tongue to the socket. In order to make the connection between the tongue 7 and socket 23 positive, I provide a king-bolt 25 which extends through openings formed in the socket and tongue, the king-bolt being secured from displacement by nut 26. In order to control the extent of movement of the tongue into the socket I provide a guide pin 27, which extends transversely through the tongue 7 and through longitudinally extending openings 28 formed at diametrically opposite points in the socket 23. The pin 27 is held from displacement by a key 29. The key 29 can be engaged with the tongue and pin 27 only through the king-bolt opening in the socket and tongue. Consequently, it is necessary to first advance the tongue 7 into the socket to the point where the key opening of the tongue communicates with the king-bolt opening in the socket and tongue, after which the pin 27 is engaged through the slots or openings 28 and the pin opening in the socket 7. Pursuant to this, the key 29 is permitted to gravitate through its slot or opening in the tongue 7 and through a complemental opening in the pin 27. The free end of the key will impinge against the inner periphery of the socket 23, thereby limiting the extent of movement of the key.

It is of course, to be understood that the frame 9 of the coupler may be permanently attached to the motor vehicle, since it is relatively small and may be engaged with the vehicle frame, either within the confines of the tire rack, or beneath the trunk rack. In either position the frame will not project beyond a tire carried on the tire rack, or beyond the trunk rack, even when the latter is in a folded position. The other parts of the coupler, including the clevis bolt and socket, may be expeditiously and conveniently engaged with the frame 9 in the manner already described, following which the tongue of the trailer can be slipped into the socket of the coupler and secured in the manner also heretofore described. By interposing the bushing 13 between the apex of the housing of the frame 9 and the brace bar 12, it is apparent that undue stress or strain will be taken off the bar, since the line of stress will be parallel to the longitudinal axis of the bushing. The free ends of the strap are shown bolted to the frame of the motor vehicle, but it is of course, to be understood that they may be engaged in any other manner, although I have found the present connection to be satisfactory. The manner of mounting the clevis bolt in the frame 9 and the manner of connecting the tongue socket to the clevis bolt insures flexibility between the motor vehicle and trailer while passing over inequalities in the road of travel. It of course is manifest that the trailer may be quickly detached from the motor vehicle by disengaging the tongue 7 from the socket 23; by disengaging the socket from the swivel block 19; or by disengaging the clevis bolt from the frame 9.

Various changes may be made in the construction, proportion and arrangement of parts of my invention, within the scope of the appended claims.

What is claimed is:

1. Means for engaging a motor vehicle with a trailer equipped with a tongue, including a coupler engaged with the vehicle and including an elongated socket complementing the trailer tongue and adapted for slidable engagement with the latter, complemental means carried by the tongue and socket to automatically lock the tongue in said socket, guide means carried by the tongue and engaging said socket to limit the extent of movement of the tongue in the socket and means to positively prevent displacement of the tongue from the socket.

2. In a trailer for attachment to a motor vehicle, a tongue, a socket detachably engaged with the tongue and provided with longitudinally extending guide slots, a guide pin carried by said tongue and engageable in the slots of the socket, and a key extending through said pin and into the tongue for anchoring the pin.

3. In a trailer for attachment to a motor vehicle, a tongue, a socket detachably engaged with the tongue and provided with longitudinally extending guide slots, a guide pin carried by the tongue and engageable in the slots of the socket, and a key engageable with said pin through an opening in said socket to anchor the pin, the head of said pin being countersunk in the tongue to permit sliding of the socket thereover to lock the key from casual displacement.

STUART M. HEPBURN.